United States Patent
Hasegawa

(10) Patent No.: US 8,248,046 B2
(45) Date of Patent: Aug. 21, 2012

(54) DC-DC CONVERTER FOR PULSE FREQUENCY MODULATION CONTROL AND POWER SUPPLY SYSTEM

(75) Inventor: Morihito Hasegawa, Aichi (JP)

(73) Assignee: Fujitsu Semiconductor Limited, Yokohama (JP)

( * ) Notice: Subject to any disclaimer, the term of this patent is extended or adjusted under 35 U.S.C. 154(b) by 155 days.

(21) Appl. No.: 12/049,941

(22) Filed: Mar. 17, 2008

(65) Prior Publication Data
US 2008/0224674 A1    Sep. 18, 2008

(30) Foreign Application Priority Data
Mar. 16, 2007 (JP) ................................ 2007-068568

(51) Int. Cl.
G05F 1/00 (2006.01)
(52) U.S. Cl. ...................................... 323/271; 323/285
(58) Field of Classification Search .................. 323/271, 323/272, 285
See application file for complete search history.

(56) References Cited

U.S. PATENT DOCUMENTS

| | | | |
|---|---|---|---|
| 5,481,178 A | 1/1996 | Wilcox et al. | |
| 5,568,044 A * | 10/1996 | Bittner | 323/272 |
| 5,731,694 A | 3/1998 | Wilcox et al. | |
| 5,994,885 A | 11/1999 | Wilcox et al. | |
| 6,304,066 B1 | 10/2001 | Wilcox et al. | |
| 6,580,258 B2 | 6/2003 | Wilcox et al. | |
| 7,061,213 B2 | 6/2006 | Yoshida | |
| 7,161,815 B2 * | 1/2007 | Mori | 363/21.12 |
| 7,221,129 B2 * | 5/2007 | Matsuo et al. | 323/222 |
| 7,250,745 B2 | 7/2007 | Yasukouchi et al. | |
| 7,596,007 B2 * | 9/2009 | Phadke et al. | 363/71 |
| 2004/0257055 A1 * | 12/2004 | Aioanei | 323/282 |
| 2005/0057238 A1 * | 3/2005 | Yoshida | 323/282 |
| 2005/0088156 A1 * | 4/2005 | Cheung et al. | 323/282 |
| 2005/0258811 A1 * | 11/2005 | Matsuo et al. | 323/282 |
| 2005/0258814 A1 * | 11/2005 | Chen et al. | 323/285 |
| 2005/0285579 A1 | 12/2005 | Yasukouchi et al. | |
| 2007/0229039 A1 * | 10/2007 | Kim | 323/222 |
| 2007/0247346 A1 * | 10/2007 | Chen et al. | 341/155 |
| 2008/0022139 A1 * | 1/2008 | Lin et al. | 713/320 |
| 2008/0238392 A1 * | 10/2008 | Cheung et al. | 323/283 |
| 2009/0033305 A1 * | 2/2009 | Hane | 323/288 |
| 2009/0058388 A1 * | 3/2009 | Kanakubo | 323/288 |

FOREIGN PATENT DOCUMENTS

| | | |
|---|---|---|
| JP | 06-303766 A | 10/1994 |
| JP | 08-340675 A | 12/1996 |
| JP | 10-323035 | 12/1998 |
| JP | 11-089222 A | 3/1999 |
| JP | 2000-102249 | 4/2000 |
| JP | 2001-238441 | 8/2001 |
| JP | 2004-96982 A | 3/2004 |
| JP | 2006-014482 | 1/2006 |
| JP | 2006-14482 A | 1/2006 |
| JP | 2006-340442 | 12/2006 |

OTHER PUBLICATIONS

Japanese Office Action dated Jan. 10, 2012, 5 pages.

* cited by examiner

Primary Examiner — Adolf Berhane
Assistant Examiner — Jeffrey Gblende
(74) Attorney, Agent, or Firm — Arent Fox LLP

(57) ABSTRACT

A DC-DC converter prevents localization of switching operations at light loads and is able to improve power conversion efficiency. The DC-DC converter of some variations performs pulse frequency modulation control at light loads, and includes a reducing circuit configured to skip an oscillation frequency signal at light loads and to generate a skipped signal.

17 Claims, 9 Drawing Sheets

DC-DC CONVERTER FOR PULSE FREQUENCY MODULATION CONTROL AND POWER SUPPLY SYSTEM

CROSS-REFERENCE TO RELATED APPLICATIONS

This application is based upon and claims the benefit of priority from the prior Japanese Patent Application No. 2007-068568 filed on Mar. 16, 2007, the entire contents of which are incorporated herein by reference.

BACKGROUND OF THE INVENTION

1. Field of the Invention

The present application relates to a DC-DC converter.

2. Description of Related Art

A DC-DC converter is controlled by switching operational methods between a PFM (Pulse Frequency Modulation) method and a PWM (Pulse Width Modulation) method. The typical DC-DC converter is operated using the PWM method in normal operational states, including at heavy load times, and is switched to the PFM method at light load times.

FIG. 1 shows a DC-DC converter 100 of the related art. In FIG. 1, an error amplifier ERA101 of a control circuit 111 amplifies the difference in voltage between 1) an output voltage Vout of the DC-DC converter, as divided by a resistive element R101 and a resistive element R102, and 2) a reference voltage e101, to produce an output voltage Vc. In operation, for example, if the output voltage Vout rises, the difference between Vout and the reference voltage e101 becomes smaller, and the output voltage Vc falls. Further, if the output voltage Vc becomes lower than a reference voltage e102, a voltage comparator COMP102 outputs a low-level output voltage Vd2.

As shown in FIG. 1, an AND gate circuit AND102 get through a pulse signal PS when a high-level output voltage Vd2 is input from the voltage comparator COMP102, and inputs an output into a set terminal S of a flip-flop FF as a set signal SS. In addition, the AND gate circuit AND102 masks pulse signal PS when the low-level output voltage Vd2 is input. As a result, switching operation of the DC-DC converter 100 is skipped. This function can avoid a rise in output voltage by preventing a transistor FET101 from turning on when the load becomes lighter and the output voltage Vout of the DC-DC converter 100 rises above a specified value. Meanwhile, because the transistor FET101 switches at a different frequency from the oscillator frequency of an oscillation OSC, operation of the PFM may be controlled.

FIG. 2 shows a timing chart for the DC-DC converter 100 of the related art of FIG. 1. As shown in FIG. 2, the DC-DC converter 100 masks the pulse signal PS, depending on the output voltage Vout. In operation, this is accomplished by the DC-DC converter directly controlling ON/OFF switching, depending on the output voltage Vout. As FIG. 2 shows, switching operations continuously occur until the output voltage Vout reaches a specified voltage, at which time the switching operation ceases until the output voltage Vout becomes lower than a reference voltage. As a result, the switching operation might "localize" as shown in area R100. The occurrence of this localization phenomenon can be a problem in the related art because a noise can be generated, or a ripple in the output voltage Vout can occur or increase. Localization of this switching phenomenon may also be a problem because it can thereby be generated even in static states, appearing as noise, where load is generally constant.

There remains a need in the related art for control a circuit for DC-DC converters that is useful to avoid localization of switching operation at light loads and that can improve power conversion efficiency.

SUMMARY OF THE INVENTION

According to one aspect of an embodiment of the present invention, it is provided that a DC-DC converter that performs pulse frequency modulation control at light loads, comprising: an oscillation circuit configured to output an oscillation frequency signal; a skipping circuit configured to skip the oscillation frequency signal at light load and to generate a skipped signal; and a pulse width modulation control circuit configured to control ON and OFF states of a first transistor and a second transistor based on the skipped signal generated by the reducing circuit.

Additional advantages and novel features of the invention will be set forth in part in the description that follows, and in part will become more apparent to those skilled in the art upon examination of the following or upon learning by practice of the invention.

DESCRIPTION OF THE PREFERRED EMBODIMENTS

Figure 1:
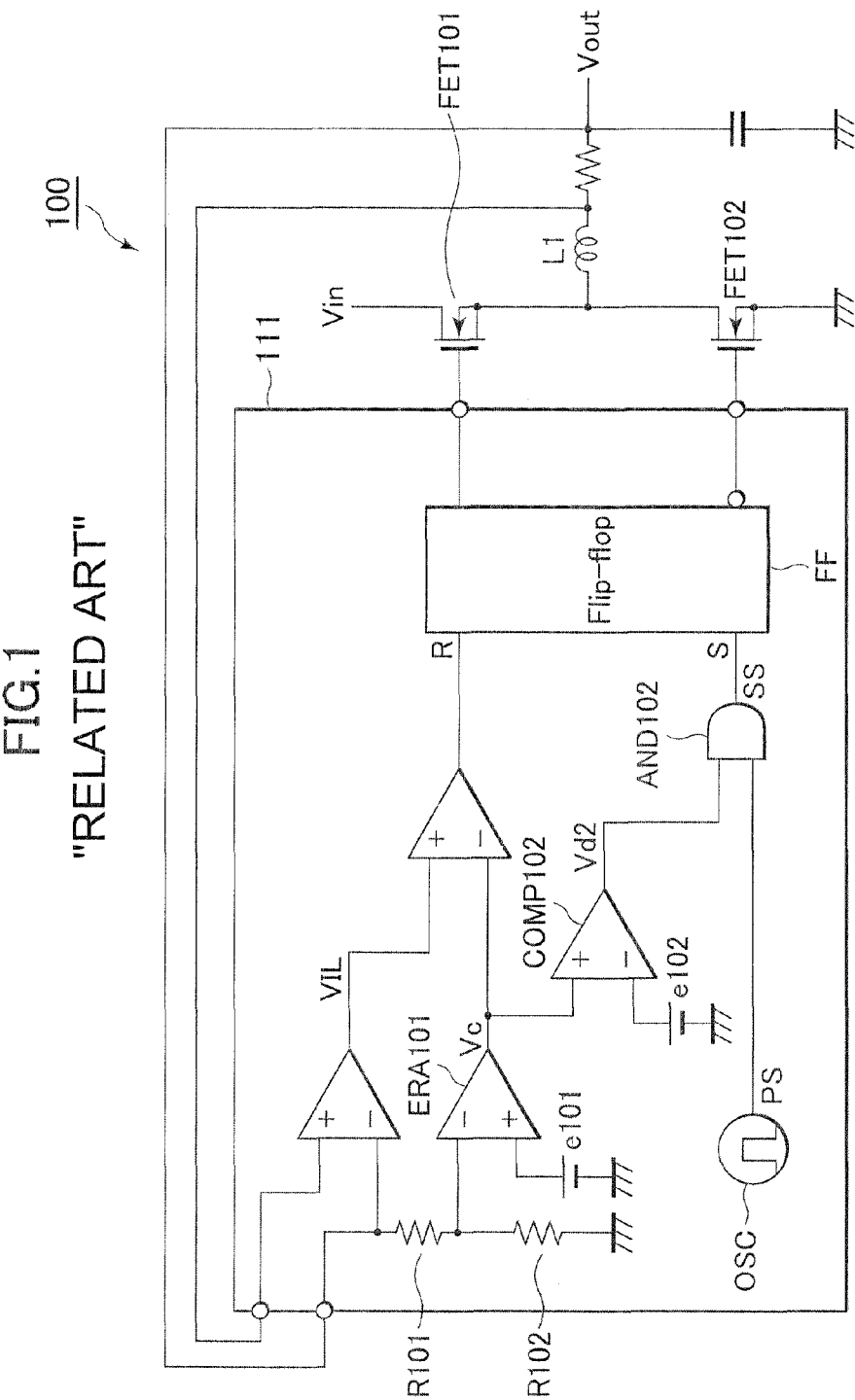
FIG. 1 shows a DC-DC converter.
Figure 2:
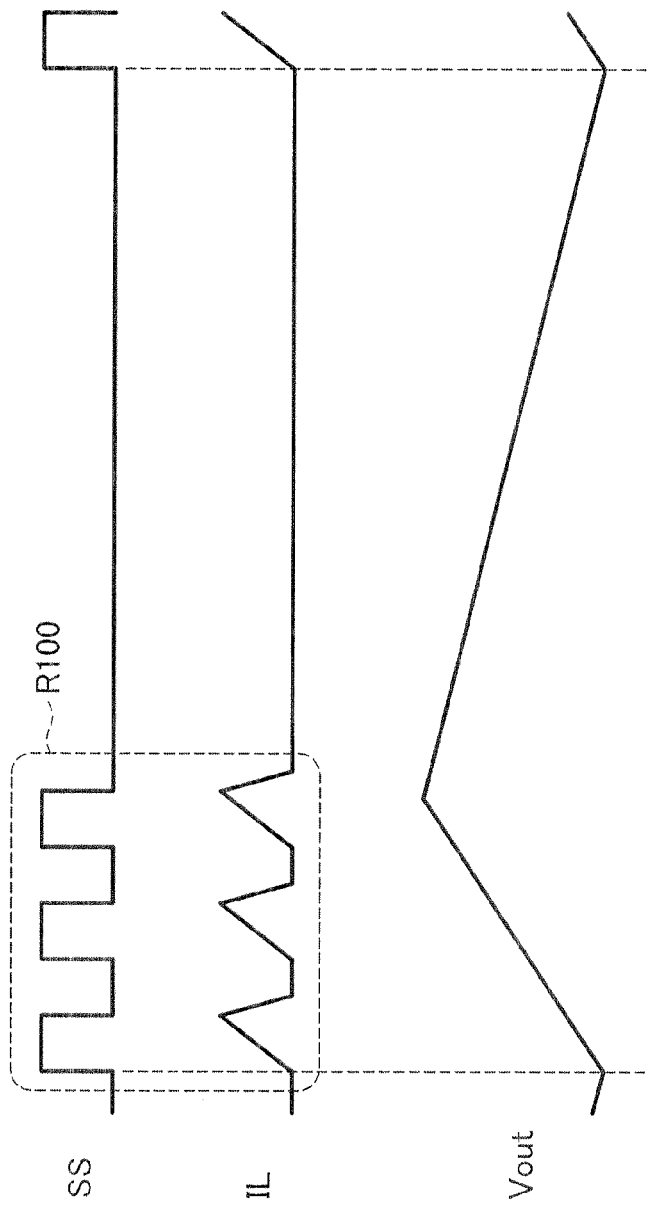
FIG. 2 is a timing chart for the DC-DC converter of FIG. 1.
Figure 3:
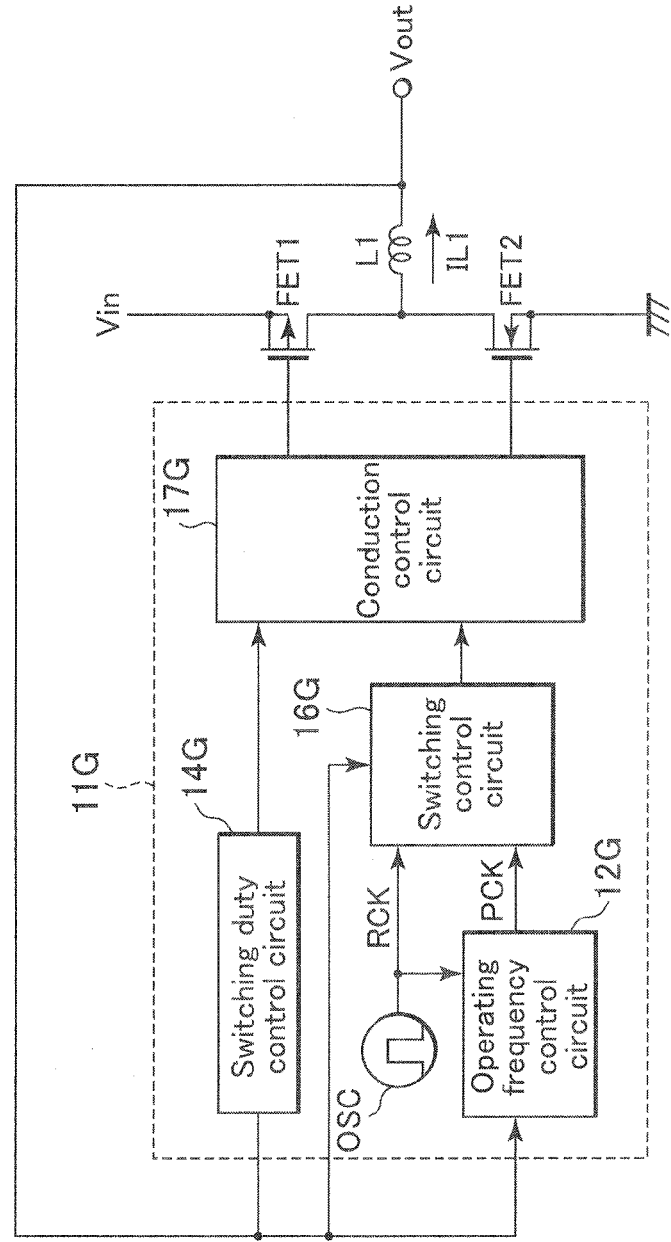
FIG. 3 shows a circuit diagram of a DC-DC converter in accordance with an embodiment of the present invention.

FIG. 3 shows various circuit components for use in accordance with an embodiment of the present invention. A DC-DC converter 1G includes a control circuit 11G, transistors FET1 and FET2, and a choke coil L1. An input voltage Vin is input into a source terminal of the transistor FET1. A drain terminal of the transistor FET1 is connected to a terminal of the choke coil L1 and to the drain terminal of the transistor FET2. The source pin of the transistor FET2 is coupled to ground. The gate terminals of the transistors FET1 and FET2 are coupled to a conduction control circuit 17G. The other terminal of the choke coil L1 outputs an output voltage Vout, and the output voltage Vout is supplied to a load (not shown in FIG. 3), for example.

As further shown in FIG. 3, the control circuit 11G also includes an operating frequency control circuit 12G, a switching duty control circuit 14G, a switching control circuit 16G, the conduction control circuit 17G and an oscillator OSC. The output terminal of the choke coil L1 is coupled to the operating frequency control circuit 12G, to the switching duty control circuit 14G and to the switching control circuit 16G. A reference clock signal RCK output from the oscillator OSC is input to the operating frequency control circuit 12G and to the switching control circuit 16G. A control clock signal PCK output from the operating frequency control circuit 12G is input to the switching control circuit 16G. An output terminal of the switching control circuit 16G is coupled to the conduction control circuit 17G, and an output terminal of the switching duty control circuit 14G is coupled to the conduction control circuit 17G.

The DC-DC converter 1G of FIG. 3 is able to selectably use a control method based on either or both of PWM control and PFM control. PWM control addresses situations in which a repetition period of an operation cycle occurs regularly, regardless of load (electrical power). In contrast, PFM control lengthens or shortens the repetition period of the operational cycle, depending on load (electrical power).

The oscillator OSC of FIG. 3 outputs the reference clock signal RCK, when sets the repetition period of the operation cycle of PWM control for the DC-DC converter 1G. The operating frequency control circuit 12G generates the control clock signal PCK. The control clock signal PCK, which sets the operational cycle frequency for PFM control, can be obtained by dividing the frequency of the reference clock signal RCK. The control clock signal PCK is inversely related to the output voltage Vout of the DC-DC converter, in that the frequency of the control clock signal PCK may be decreased at a time of low load and high output voltage Vout, and the frequency of the control clock signal PCK may be increased at a time of high load and low output voltage Vout.

The switching duty control circuit 14G of FIG. 3 controls operation (on-duty) of the transistor FET1, depending on the output voltage Vout. The output voltage Vout is input to the switching control circuit 16G, and the switching control circuit 16G controls switching between PWM control and PFM control, depending on the output voltage Vout.

If the switching control circuit 16G determines that the electric energy of the DC-DC converter 1G is necessary because the load is high, for example, the switching control circuit 16G selects the reference clock signal RCK to control output. The conduction control circuit 17G thereby controls transistors FET1 and FET2 as a function of the reference clock signal RCK. Because, by fixing the frequency of the reference clock signal RCK, the repetition period of the operational cycle is fixed regardless of the load (electrical power), the DC-DC converter 1G is therefore effectively controlled by PWM control.

On the other hand, if the switching control circuit 16G determines that the load is too low to consume even minimal required power, the switching control circuit 16G selects the control clock signal PCK to control output. The conduction control circuit 17G thereby controls transistors FET1 and FET2 as a function of the control clock signal PCK. Because the frequency of the control clock signal PCK is variably adjustable, depending on the load (electrical power), the DC-DC converter 1G is thereby controllable by PFM control. In this operational manner, fixed loss can be reduced by lowering the switching frequency when the load is low, and the efficiency of the DC-DC converter can thereby be increased.

The operating frequency control circuit 12G, the switching control circuit 16G and the conduction control circuit 17G have a function to skip the frequency signal from the oscillator OSC and to generate a skipped signal for controlling a switching of the transistor FET1 when the load is light. In other words, they (12G, 16G and 17G) have a function to intermit the continuous frequency signal from the oscillator OSC to generate an intermittent signal.

The switching control circuit 16G and the conduction control circuit 17G also have a function to generate a control signal for controlling a switching of the transistor FET1 under PWM control.

The DC-DC converter 1G of FIG. 3 controls the frequency of the control clock signal PCK, depending on the output voltage at PFM operation. Then, a switching operation is performed, based on the control clock signal PCK. With this approach, the localization effect in switching operation is avoided, and it thus becomes possible to prevent noise from occurring and to reduce the ripple in the output voltage.

Moreover, not only may the switching frequency of the transistor FET1 be set by the control clock signal PCK, but the on-duty time of the transistor FET1 may be set by the switching duty control circuit 14G of FIG. 3. As a result, when PFM control is performed, PWM control function may also be performed. For example, even when an abrupt change of load occurs within a period of one cycle of the control clock signal PCK, the abrupt change of the load can be handled by enabling the switching duty control circuit 14G to perform PWM control. This operation thus results in increased load following capability in the DC-DC converter 1G, which produces an appropriate the output voltage Vout for load change.

In addition, as shown in FIG. 3, because the control clock signal PCK is obtained by dividing the reference clock signal RCK, the clock signals are synchronized. By preventing a spike waveform component from being generated at switching between operation of the reference clock signal RCK and that of the control clock signal PCK, switching noise can be prevented from being generated.

Figure 4:
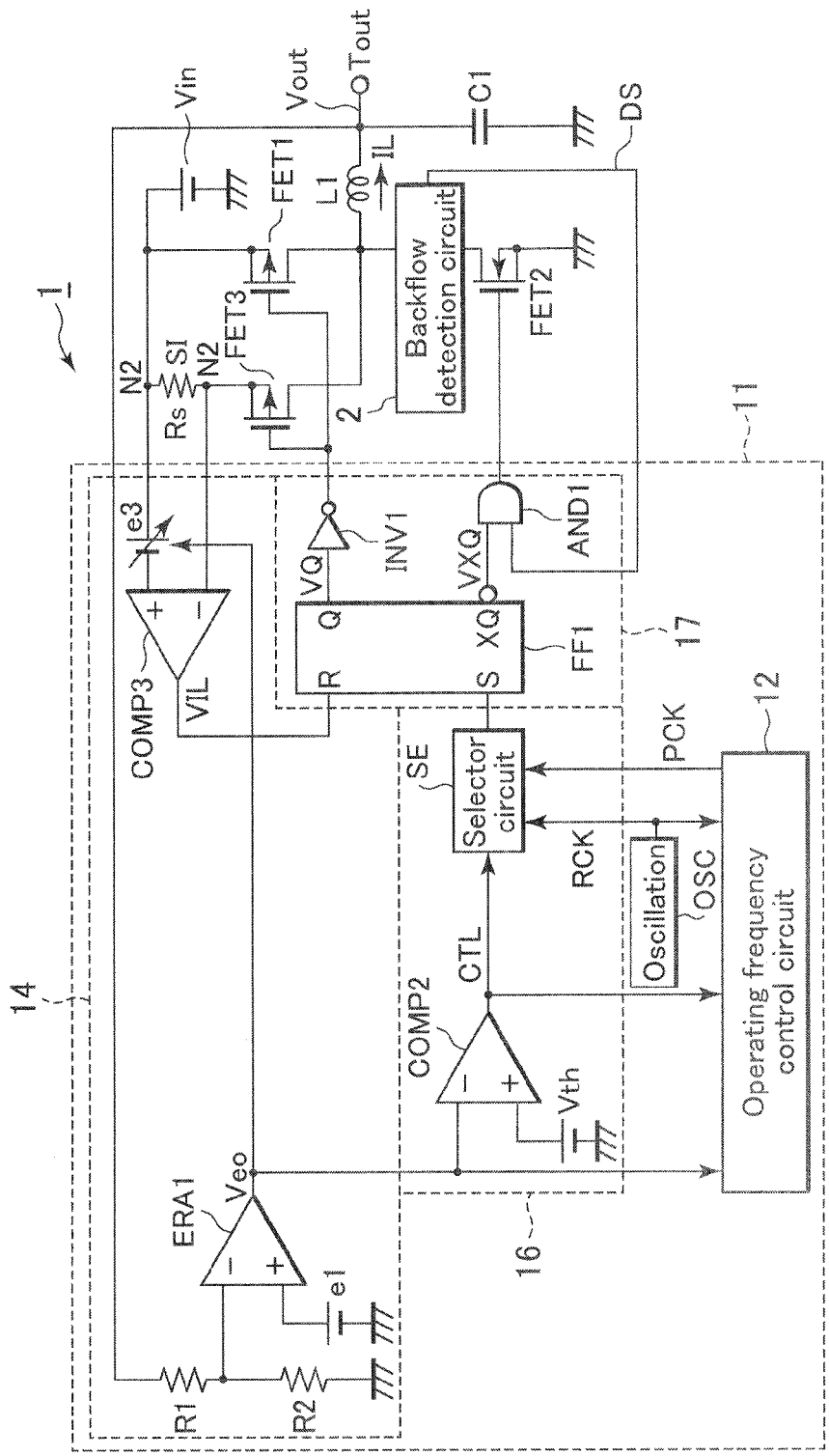
FIG. 4 shows a circuit diagram of another DC-DC converter in accordance with an embodiment of the present invention.

FIG. 4 shows a DC-DC converter 1 of another embodiment of the present invention. An input voltage Vin is input into a source terminal of the transistor FET1. The drain terminal of the transistor FET1 is coupled to the drain terminal of the transistor FET2, via a backflow detection circuit 2, and is also coupled to a terminal of the choke coil L1 and to the drain terminal of the transistor FET3. The source pin of the transistor FET2 is coupled to ground. The gate terminals of the transistors FET1 and FET2 are coupled to the flip-flop FF1 in a control circuit 11, as described further below. Another terminal of the choke coil L1 is coupled to the output terminal Tout, and the input voltage Vin is decreased and output as the output voltage Vout. To accumulate electrical potential suppliable via the choke coil L1 in the output terminal Tout, an output capacitor C1 is coupled between the output terminal Tout and ground.

As further shown in FIG. 4, sense resistor Rs and transistor FET3 are located in parallel with transistor FET1. One node N2 of the sense resistor Rs is coupled to the source terminal of the transistor FET1 and to the input voltage Vin, as well as to the non-inverted input terminal of a voltage comparator COMP3, via an offset voltage e3. The other node N1 of the sense resistor Rs is coupled to the inverted input terminal of the voltage comparator COMP3 and to the source terminal of the transistor FET3. The drain terminal of the transistor FET3 is commonly coupled to the choke coil L1, to the drain terminal of the transistor FET1 and to the backflow detection circuit 2.

The control circuit 11 of FIG. 4 adjusts the output voltage Vout to a specified voltage at decreasing the input voltage Vin and supplying electrical power to the output terminal Tout by providing alternating conduction control of transistors FET1 and FET2. The control circuit 11 includes an operating frequency control circuit 12, a switching duty control circuit 14, a switching control circuit 16, the conduction control circuit 17 and an oscillator OSC.

The switching duty control circuit 14 of FIG. 4 includes an error amplifier ERA1 and the voltage comparator COMP3. The error amplifier ERA1 amplifies the difference between the output voltage Vout of the DC-DC converter 1 and the reference voltage e1. The output terminal Tout is coupled to a terminal of resistive element R1, which in turn is coupled with ground, via a resistive element R2. The connection point between resistive elements R1 and R2 is coupled to the inverted input terminal of the error amplifier circuit ERA1. Reference voltage e1 is applied to the non-inverted input terminal of error amplifier ERA1. An output voltage Veo is output from the error amplifier ERA1.

Node N2 is coupled to the non-inverted input terminal of the voltage comparator COMP3, via the offset voltage e3. Offset voltage e3 is set to be variable, so as to fall when the output voltage Vout rises, such as in a light load state, and so as to rise when the output voltage Vout falls, such as in a heavy load state. In addition, the node N1 is coupled to the inverted input terminal of the voltage comparator COMP3.

A switching control circuit 16 in FIG. 4 includes a voltage comparator COMP2 and a selector circuit SE. An output voltage Veo is input to the inverted input terminal of the voltage comparator COMP2, and a reference voltage Vth is input to the non-inverted input terminal of the voltage comparator COMP2. A control signal CTL is output from the voltage comparator COMP2. In addition, the reference clock signal RCK, the control clock signal PCK and the control signal CTL are input to the selector circuit SE. The output terminal of the selector circuit SE is coupled to a set terminal S of the flip-flop FF1.

The conduction control circuit 17 in FIG. 4 includes the flip-flop FF1, the AND gate circuit AND1 and an inverter INV1. An output terminal Q of the flip-flop FF1 is coupled to the gate terminals of transistors FET1 and FET3 via an inverter INV1. An output terminal XQ is coupled to one side of the input terminal of the AND gate circuit AND1, and the output terminal of the backflow detection circuit 2 is coupled to the other side of the input terminal of the AND gate circuit AND1. The output terminal of the AND gate circuit AND1 is coupled to the gate terminal of the transistor FET2. Output terminals Q and XQ output control signals VQ and VXQ, respectively.

Figure 5:
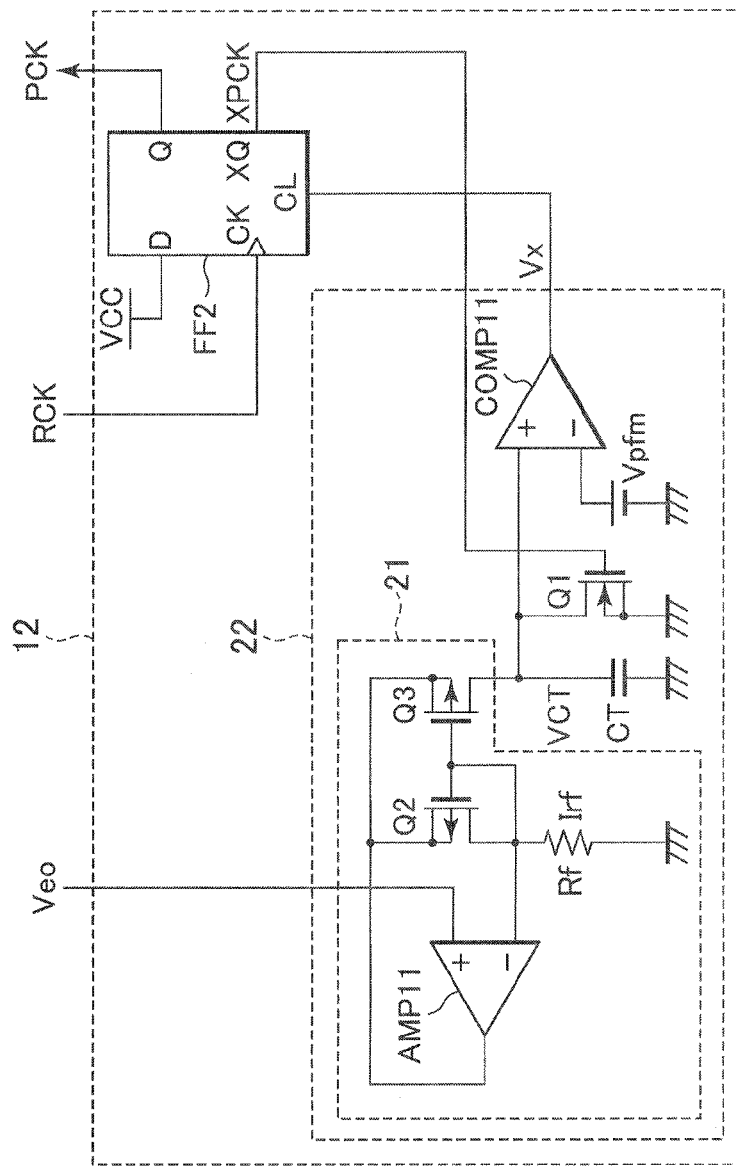
FIG. 5 shows a circuit diagram of an operating frequency control circuit for the DC-DC converter of FIG. 4.

FIG. 5 shows a circuit configuration for the operating frequency control circuit 12 of FIG. 4. The operating frequency control circuit 12 includes a timer circuit 22 and a flip-flop FF2. The timer circuit 22 includes a voltage-to-current conversion circuit 21, a capacitor CT, a transistor Q1 and a voltage comparator COMP11.

The voltage-to-current conversion circuit 21 of FIG. 5 includes transistors Q2 and Q3, a current measurement resistor Rf and voltage amplifier AMP11. The drain terminal of the transistor Q2 is coupled to the inverted input terminal of the voltage amplifier AMP11, as well as to the input terminal of the current measurement resistor Rf. The output voltage Veo is input to the non-inverted input pin of the voltage amplifier AMP11. In addition, the output terminal of the current measurement resistor Rf is grounded. A current mirror circuit includes transistors Q2 and Q3. The source terminals of transistors Q2 and Q3 are commonly coupled to the output terminal of the voltage amplifier AMP11.

As further shown in FIG. 5, the capacitor CT is coupled to the transistor Q3 in series. The transistor Q1 is coupled to the capacitor CT in parallel. The output terminal of the capacitor CT and the drain terminal of the transistor Q1 are coupled to the non-inverted input terminal of the voltage comparator COMP11. In addition, a reference voltage Vpfm is input to the inverted input terminal of the voltage comparator COMP11. The voltage comparator COMP11 outputs an output voltage Vx.

The reference clock signal RCK is input to the clock terminal CK of the flip-flop FF2. A power supply voltage VCC is input to the data terminal D. The output voltage Vx from the voltage comparator COMP1 is input to a clear terminal CL. The output terminal Q outputs the control clock signal PCK. The output terminal XQ outputs a reversed-phase PFM clock signal XPCK.

Figure 6:
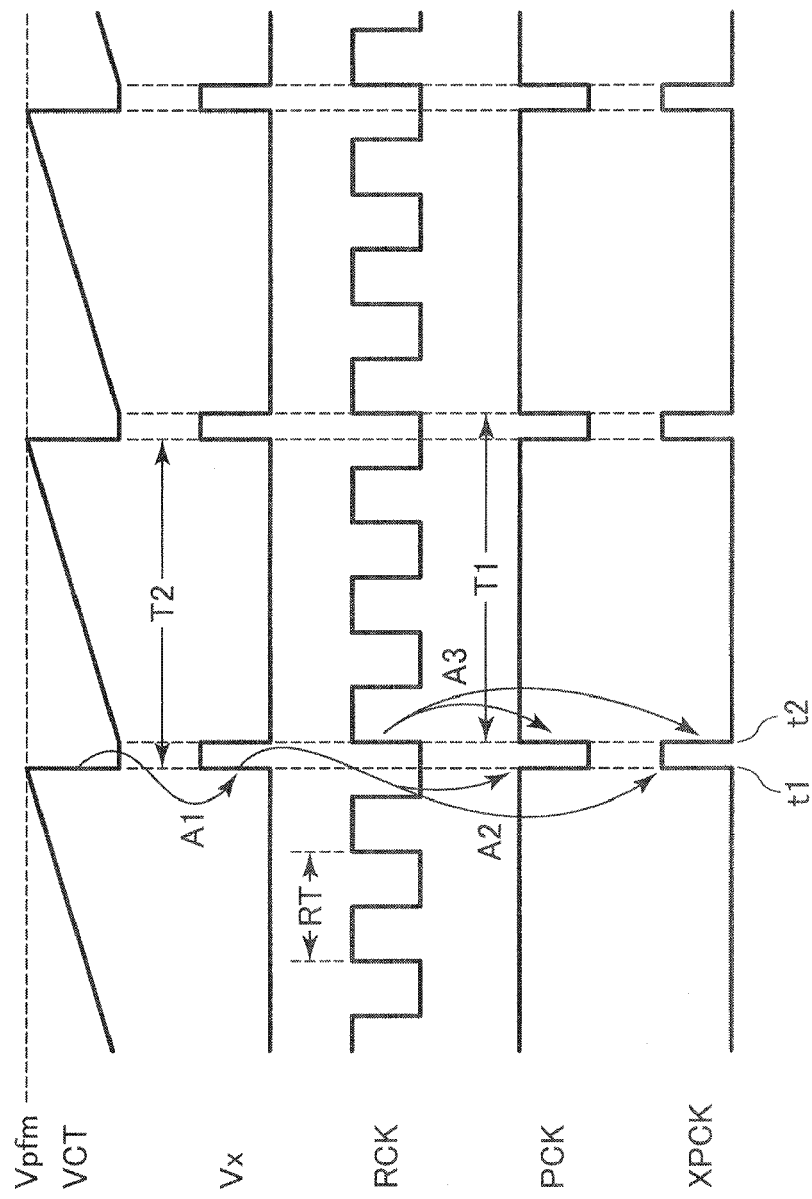
FIG. 6 is a timing chart for the operating frequency control circuit of FIG. 5.
Figure 7:
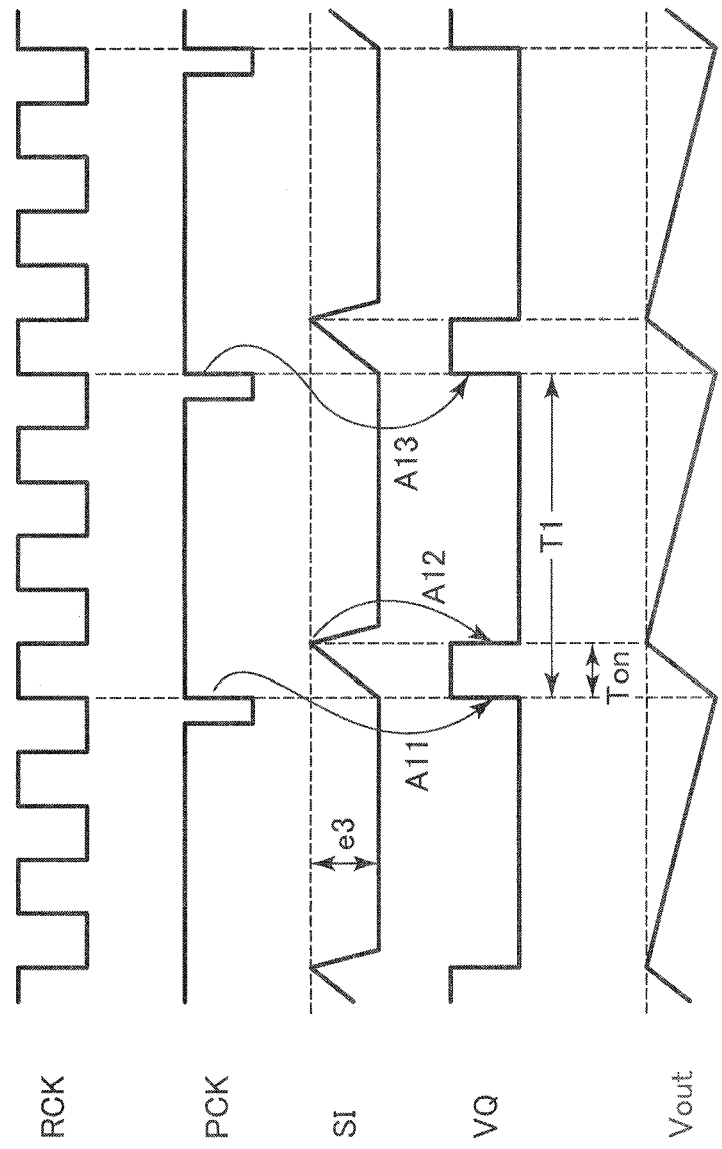
FIG. 7 is a timing chart for the DC-DC converter of FIG. 4.

FIG. 6 shows a timing chart for the operating frequency control circuit of FIG. 5, and FIG. 7 shows a timing chart for the DC-DC converter of FIG. 4.

The operational logic for selecting whether PWM control or PFM control is performed based on the control signal CTL output from the voltage comparator COMP2 of FIG. 4. Operation of the DC-DC converter 1 when PWM control is performed will be explained first. When the output voltage Veo is higher than the reference voltage Vth, the voltage comparator COMP2 determines that a high load state exists, and that the control signal CTL is at a low level. The selector circuit SE proceeds to select the reference clock signal RCK as the output to the flip-flop FF1, since the control signal CTL is at a low level. The operating frequency control circuit 12 of FIG. 4 then enters a stop state since the control signal CTL is at a low level. The DC-DC converter 1 thereby performs PWM control.

As shown in FIGS. 6 and 7, the flip-flop FF1 of FIG. 4 triggers with (is set by) the rising edge of the reference clock signal RCK. The control signal VQ is at a high level, and both transistors FET1 and FET3 of FIG. 4 are in a conductive state. The control signal VXQ is at a low level, and the transistor FET2 is in a non-conductive state. When the transistors FET1 and FET3 are turned on, a coil current IL flows into the choke coil L1 from the input voltage Vin via transistors FET1 and FET3, and the coil current IL is supplied to the load. At that time, a shunt current SI flows into the sense resistor Rs. Then, if the shunt current SI exceeds the specified amount of the current defined by the offset voltage e3, the output voltage signal VIL output from the voltage comparator COMP3 flips from negative to positive.

The flip-flop FF1 is reset by inputting the output voltage signal VIL from the voltage comparator COMP3, having transitioned to a high level, to a reset terminal R. The control signal VQ is then at a low level, and both transistors FET1 and FET3 are in a non-conductive state. Further, the control signal VXQ is at a high level and the transistor FET2 is therefore in a conductive state. The flip-flop FF1 is set depending on the rising edge of the next reference clock signal RCK. Because this operation is repeated, the operational frequency of the DC-DC converter 1 becomes the same as the frequency of the reference clock signal RCK. The repetition period of the operational cycle is thus fixed to a specified period, defined by the reference clock signal RCK, for PWM control, regardless of the load (electrical power).

As shown in FIG. 6, if the load enters a light load state and the load current consumed by the load decreases, the lower value of a saw-tooth waveform of coil current IL might be negative. In the range where the lower value is negative, the current direction reverses, and the current flows back to the choke coil L1 from the load. A backflow detection circuit 2 monitors the backflow current and outputs the detection signal DS at a high level, in order to cause the control signal VXQ to flow through when the backflow detection circuit 2 does not detect any backflow. In contrast, when the backflow detection circuit 2 detects a backflow, the backflow detection circuit 2 outputs the detection signal DS at a low level, in order to cause the output of the AND gate circuit AND1 to be at a low level and to mask the control signal VXQ. Operation so as to prevent the coil current IL from backflowing is thus obtained.

Switching operation from PWM control to PFM control for the DC-DC converter 1 of FIG. 4 will now be explained. The lighter the load becomes, the higher the output voltage Vout rises, and the lower the output voltage Veo falls. If the output voltage Veo falls below the reference voltage Vth, the voltage comparator COMP2 determines that a low load state exists, and the control signal CTL transitions from a low level to a high level. The selector circuit SE selects the control clock signal PCK if the control signal CTL is at a high level and provides an output to the flip-flop FF1. The operating frequency control circuit 12 transitions from a stop state to an operating state if the control signal CTL is at a high level. As a result, PWM control is switched with PFM control in the DC-DC converter 1.

FIG. 5 shows a circuit diagram of an operating frequency control circuit for the DC-DC converter of FIG. 4. The operating frequency control circuit 12 generates the control clock signal PCK, as shown in FIG. 6. The voltage amplifier AMP11 included in the voltage-to-current conversion circuit 21, via a feedback control, adjusts a current Irf in order to produce voltage drop across the current measurement resistor Rf so as to equal the voltage drop to the output voltage Veo. An equivalent current to the current Irf passes through the current mirror circuit, including the transistor Q2 and transistor Q3, and output from transistor Q3. As a result, the voltage-to-current conversion circuit 21 performs voltage-to-current conversion that outputs a current Irf that varies as a function of the output voltage Vout.

Because the capacitor CT of FIG. 5 is coupled to transistor Q3 in series, capacitor CT is charged by the current equivalent to Irf that flows into transistor Q3. In addition, the output voltage VCT rises with time, as shown in FIG. 6. At a time t1 in FIG. 6, the output voltage VCT rises to the equivalent of the reference voltage Vpfm, the output voltage Vx of the voltage comparator COMP11 transitions from a low level to a high level, as shown by A1 in FIG. 6. By inputting the output voltage Vx at a high level to the clear terminal CL of the flip-flop FF2, the control clock signal PCK output from the output terminal Q transitions to a low level, and the reversed-phase PFM clock signal XPCK output from the output terminal XQ transitions to a high level, as shown by A2 in FIG. 6. Then, transistor Q1 turns on as a result of the reversed-phase PFM clock signal XPCK being at a high level. In addition, the charge of capacitor CT is discharged, and the output voltage VCT resets to around 0V.

At a time t2 of FIG. 6, by inputting the reference clock signal RCK at a high level, the control clock signal PCK transitions to a high level, and the reversed-phase PFM clock signal XPCK transitions to a low level, as shown by A3 in FIG. 6. Then, because transistor Q1 turns off as a result of the reverse-phase PFM clock signal XPCK being at a low level, capacitor CT is charged by the current equivalent to current Irf that flows into the transistor Q3. These operations are then repeated.

The timer circuit 22 of FIG. 5 measures a certain period T2 shown in FIG. 6, which is determined by the capacity of capacitor CT and the current value of current Irf. Flip-flop FF2 receives as input the rising edge of the reference clock signal RCK during the period T2. As mentioned above, the operational frequency control circuit 12 divides the reference clock signal RCK during the period T2.

The operation of the conduction control circuit 17 of FIG. 4 will now be explained. The control clock signal PCK is input to the set terminal S of flip-flop FF1 of FIG. 4 by the selector circuit SE. If flip-flop FF1 is set to change state with the rising edge of the control clock signal PCK, the control signal VQ will be at a high level, and the transistors FET1 and FET3 will be in a conductive state, as shown by A11 in FIG. 7.

Further, as shown in FIG. 7, if the shunt current SI exceeds a specified amount of the current determined by the offset voltage e3, the output voltage signal VIL output from the voltage comparator COMP3 of FIG. 4 switches from negative to positive. The flip-flop FF1 is reset by inputting the output voltage signal VIL, which has transitioned to a high level, to the reset terminal R. As a result, the control signal VQ will be at a low level, and the transistors FET1 and FET3 will be in a non-conduction state, as shown by A1 in FIG. 7. Then, the flip-flop FF1 of FIG. 4 is set by the rising edge of the next control clock signal PCK, as shown by A13 in FIG. 7. This operation is then repeated.

As a result, the operational period of the DC-DC converter 1 of FIG. 4 is the same as the period T1 of the control clock signal PCK shown in FIG. 6 and FIG. 7. Because the period T1 will be made longer or shorter, depending on the load (electrical power), PFM control is performed in the DC-DC converter 1. The ON-period Ton of the transistor FET1 will be the same as the pulse width of the control signal VQ, as shown in FIG. 7. Because the pulse width of the control signal VQ will be made longer or shorter, depending on the load (electrical power), not only PFM control but also PWM control is performed in the DC-DC converter 1.

That is to say, the control circuit 11 of FIG. 3 includes two loops, with one loop setting the period T1 of FIG. 7 to start with the output voltage Vout being output to the conduction control circuit 17 via the operating frequency control circuit 12G, and the other loop setting the ON-period Ton to start with the output voltage Vout being output to the conduction control circuit 17 via the switching duty control circuit 14G.

As mentioned above, the DC-DC converter 1 of FIG. 4 controls the frequency of the control clock signal PCK as a function of the output voltage during PFM operation. Then, a switching operation is performed, based on the control clock signal PCK. As a result, the localization effect of the switching operation can be avoided, noise can be prevented from being generated and ripple in output voltage can be reduced. The electrical power can be supplied so as to even loads that require low power and would therefore otherwise be susceptible to operational frequency change of the DC-DC converter 1.

The on-duty period of transistor FET1 of FIG. 4 is determined by the switching duty control circuit 14. The switching duty control circuit 14 operates even during PFM control, in which the conduction control circuit 17 is driven by the control clock signal PCK. With this approach, not only PFM control but also PWM control, may be performed in the DC-DC converter 1. As a result, for example, even when a rapid change of load occurs during one cycle of the control clock signal PCK, the rapid change can be handled by changing the on-duty PWM control by the switching the duty control circuit 14. With this approach, the load following capability of the output voltage Vout for the load change may be increased.

Because the control clock signal PCK is obtained by dividing the reference clock signal RCK, these clock signals are synchronized. Switching noise can be avoided by preventing a spike waveform component, etc., from being generated during switching between operation with the reference clock signal RCK and operation with the control clock signal PCK.

Figure 8:
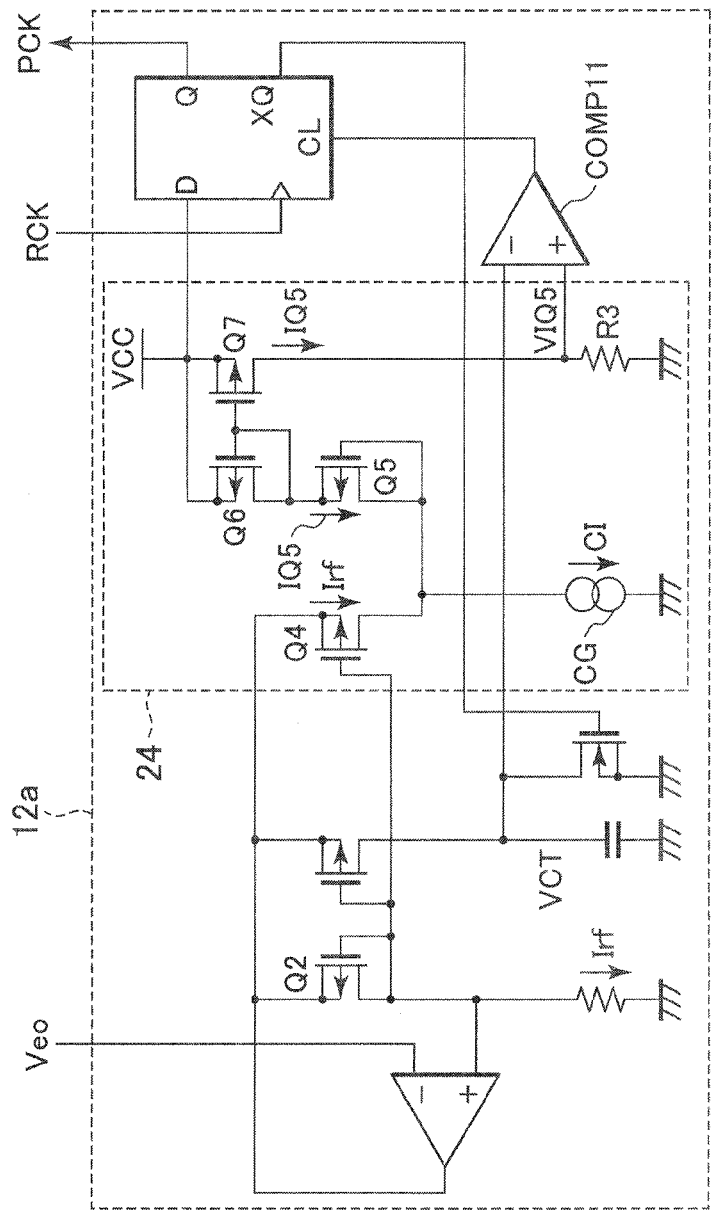
FIG. 8 shows a circuit diagram of another operating frequency control circuit of FIG. 5.

FIG. 8 shows a circuit diagram of another operating frequency control circuit 12*a*. The operating frequency control circuit 12*a* includes a reference voltage setting component 24, instead of the reference voltage Vpfm of the operating frequency control circuit 12 of FIG. 5. As shown in FIG. 8, transistor Q4 is coupled to transistor Q2 by a current mirror connection. The drain terminal of transistor Q4 and the drain terminal of transistor Q5 are commonly coupled to a constant current source CG. Transistors Q6 and Q7 are coupled by a current mirror connection. The drain terminal of transistor Q6 is coupled to the source terminal of transistor Q5. In addition, the drain terminal of transistor Q7 is coupled to the non-inverted input terminal of the voltage comparator COMP11 and to one end of a resistive element R3. The other end of the resistive element R3 is grounded. Because the other components of this circuit are similar to those in the operating frequency control circuit 12 of FIG. 5, detailed explanation is omitted here.

Further, as shown in FIG. 8, the equivalent of current Irf flows through the current mirror circuit, which includes transistor Q2 and transistor Q4, and output from the transistor Q4. A current IQ5 flows into the transistor Q5, the current IQ5 being the equivalent of the difference between the current CI of the current source CG and current Irf. An equivalent current to the current IQ5 flows trough the current mirror that includes transistors Q6 and Q7 and inputs to the resistive element R3. The voltage VIQ5 depends on the current IQ5 input to the non-inverted input terminal of the voltage comparator COMP1.

The output voltage Vx of the voltage comparator COMP11 transitions from a low level to a high level upon the output voltage VCT reaching voltage VIQ5. With this operation, the length of the period T2 is defined. If the output voltage Vout rises, such as during light loads, the output voltage Veo will fall, and the current Irf will also fall, with the result that voltage VIQ5 rises. Consequently, the length of period T2 increases. Conversely, if the output voltage Vout falls, such as at high loads, the output voltage Veo rises and the current Irf also rises, with the result that voltage VIQ5 falls. Consequently, the length of period T2 becomes shorter. Along the lines discussed above, the negative correlation between the output voltage Vout and the control clock signal PCK is thus further reinforced, and the load following capability of the output voltage Vout for the load change is enhanced.

Figure 9:
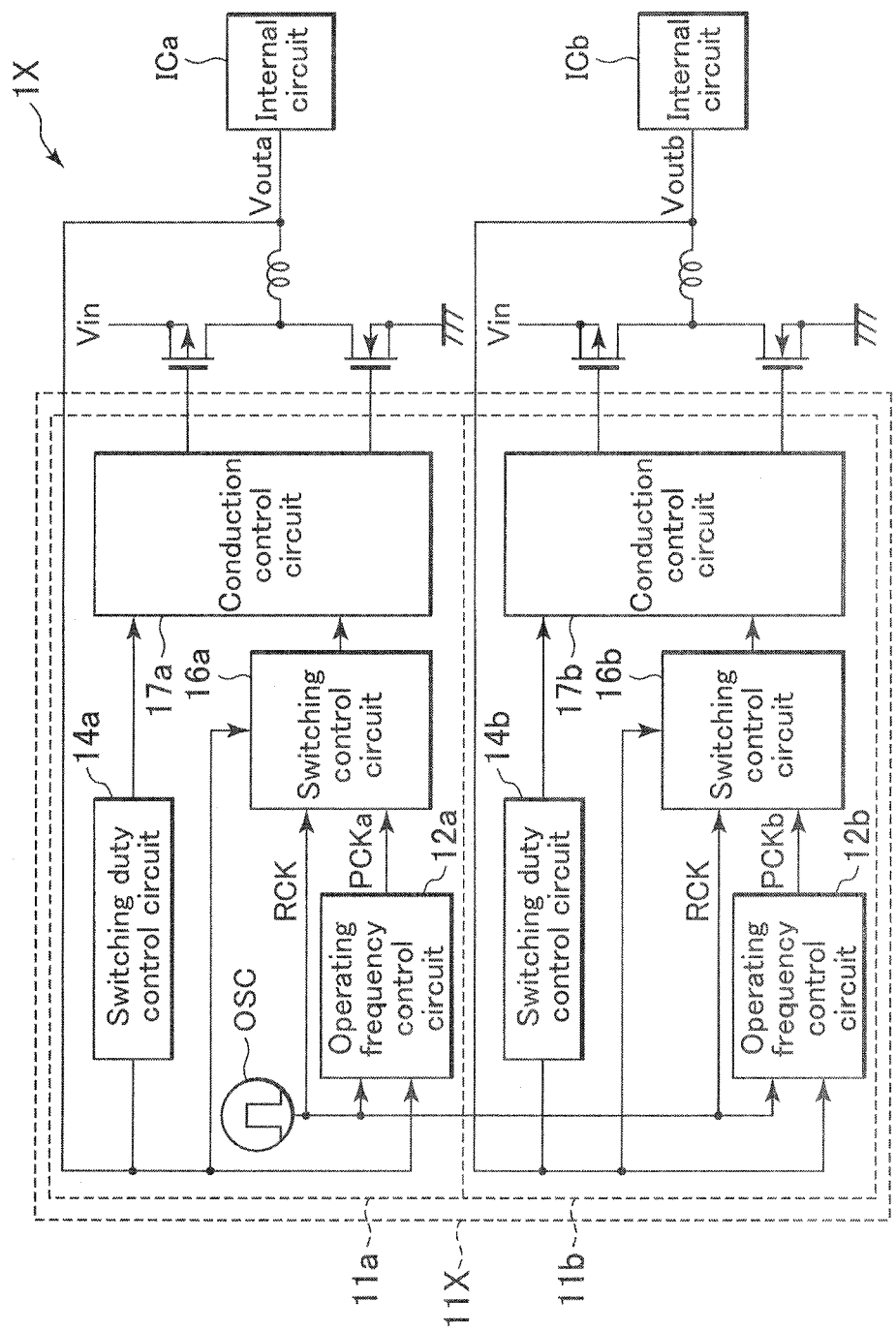
FIG. 9 shows a DC-DC converter system in accordance with an embodiment of the present invention.

FIG. 9 shows a DC-DC converter system 1X that includes a plurality of DC-DC converters. The DC-DC converter system 1X outputs voltages Vouta and Voutb, which are supplied to loads that are internal circuits ICa and ICb respectively. The DC-DC converter system 1X includes a control circuit 11X. The control circuit 11X includes the control circuits 11a and 11b. Control circuit 11a includes an operating frequency control circuit 12a, a switching duty control circuit 14a, a switching control circuit 16a, a conduction control circuit 17a, and the oscillator OSC. Control circuit 11b includes an operating frequency control circuit 12b, a switching duty control circuit 14b, a switching control circuit 16b, and a conduction control circuit 17b. A reference clock signal RCK, which is output from the oscillator OSC, is input to the switching control circuits 16a and 16b and to the operating frequency control circuits 12a and 12b. In addition, operating frequency control circuit 12a outputs a control clock signal PCKa, and operating frequency control circuit 12b outputs a control clock signal PCKb. As the other components of this circuit are similar to corresponding components in the DC-DC converter 1 shown in FIG. 4, detailed explanation is omitted here.

As further shown in FIG. 9, operating frequency control circuit 12a generates the control clock signal PCKa by dividing the frequency of the reference clock signal RCK as a function of output voltage Vouta. As a result, reference clock signal RCK and control clock signal PCKa are synchronized. Operating frequency control circuit 12b generates control clock signal PCKb by dividing the reference clock signal RCK as a function of the output voltage Voutb. Reference clock signal RCK and control clock signal PCKb are therefore synchronized. Control clock signals PCKa and PCKb are also synchronized. The control circuit 11a is controlled by the reference clock signal RCK or the control clock signal PCKa, and the control circuit 11b is controlled by the reference clock signal RCK or the control clock signal PCKb, with four combinations of the clock signals being used. However, as mentioned above, because the reference signal RCK, the control clock signal PCKa and the control clock signal PCKb are all synchronized, in any combination, control circuits 11a and 11b are synchronized. With this approach, it is possible to prevent noise that otherwise would result in noise if synchronization between the control circuits 11a and 11b were unable to be generated.

Even when the DC-DC converter system 1X includes three or more control circuits, synchronization is thus possible among all the control circuits since the control clock signal used by each control circuit is obtained by dividing the common reference clock signal RCK.

Although the above embodiments show that PWM control and PFM control can be switched via switching control circuit 16, the present invention is not limited to this embodiment. For example, the control circuit 11 shown in FIG. 4 can also be configured such that the control circuits 11 does not include a switching control circuit 16, but provides that the control clock signal PCK output from the operating frequency control circuit 12 is directly input to the set terminal of the flip-flop FF1. In this variation, the operating frequency control circuit 12 generates control clock signal PCK by dividing the reference clock signal RCK as a function of the output voltage Vout. When the output voltage Vout is low and the load is high, the frequency of control clock signal PCK is increased. As a result, the upper limit value of the frequency of the control clock signal PCK is set to a frequency at which the reference clock signal RCK is divided by 0, switching operation is performed based on the reference clock signal RCK at high load, and PWM control is thereby performed. Because the switching operation is performed based on a control clock signal PCK that is obtained by dividing the reference clock signal RCK at low load, PFM control is performed. With this approach, it becomes possible to switch between PWM control and PFM control without the need for the switching control circuit 16 of FIG. 4.

Although the above embodiments relate to a DC-DC converter on current mode control, the present invention is not limited to these applications. The present invention can also be applied to, for example, a DC-DC converter on voltage mode control.

Moreover, the control circuit 11 of FIG. 4 can be configured using one or more semiconductor chips. In addition, transistors FET1 and FET2 of FIG. 4 can be independent discrete power elements or can be mounted on the control circuit 11 as part of Large Scale Integration (LSI). Moreover, the DC-DC converter 1 of FIG. 4 can comprise a single semiconductor chip or a plurality of semiconductor chips. In addition, the DC-DC converter 1 and the control circuit 11 can be configured as a module. Further, it will be clear to those skilled in the art that the DC-DC converter 1 of various embodiments of the present invention can be applied to various power supply devices.

Transistor FFT1 is only one example of a main switching element, capacitor CT is only one example of an integrated circuit component, voltage comparator COMP11 is only one example of a first comparator, reference voltage Vpfm is one example of second reference voltages, transistor Q1 is only one example of a switch element, reference voltage Vth is only one example of a switch reference voltage, voltage comparator COMP2 is only one example of a second comparator, and voltage comparator COMP3 is only one example of a third comparator.

Example embodiments of the present invention have now been described in accordance with the above advantages. It will be appreciated that these examples are merely illustrative of the invention. Many variations and modifications will be apparent to those skilled in the art.

What is claimed is:

1. A DC-DC converter that performs pulse frequency modulation control at a light load and outputs an output signal, comprising:
    an error amplifier configured to amplify a difference between the output signal and a reference signal and to output a difference signal;
    a detection circuit configured to detect a load state based on the difference signal and to output a control signal;
    an oscillation circuit configured to output an oscillation frequency signal;
    a skipping circuit configured to, during the light load, selectively skip pulses of the oscillation frequency signal and to generate a skipped signal, wherein the skipping circuit includes a frequency intermittent circuit that outputs a pulse signal;
    a selector configured to select one of the oscillation frequency signal and the skipped signal based on the control signal; and
    a pulse width modulation control circuit configured to control ON and OFF states of a first transistor and a second transistor based on the selected signal, wherein a pulse width associated with an output signal of the pulse width modulation control circuit varies in response to the pulse signal.

2. The DC-DC converter of claim 1, wherein the pulse width associated with the output signal of the pulse width modulation control circuit varies in response to the skipped signal.

3. The DC-DC converter of claim 1, wherein the frequency intermittent circuit that outputs the pulse signal based on the oscillation frequency signal when a load voltage reaches a reference voltage.

4. The DC-DC converter of claim 3, wherein the pulse signal is output only once per cycle until the load voltage returns to a voltage corresponding to the reference voltage.

5. A DC-DC converter for performing pulse frequency modulation control for a light load condition and outputting a first output signal and a second output signal, comprising:
    an oscillation circuit configured to output an oscillation frequency signal;
    a first error amplifier configured to amplify a difference between the first output signal and a first reference signal and to output a first difference signal;
    a first detection circuit configured to detect a first load state based on the first difference signal and to output a first control signal;
    a first skipping circuit configured to, during the light load condition, selectively skip pulses of the oscillation frequency signal and to generate a first skipped signal, wherein the first skipping circuit includes a first frequency intermittent circuit that outputs a first pulse signal;
    a first selector configured to select one of the oscillation frequency signal and the first skipped signal based on the first control signal;
    a first pulse width modulation control circuit configured to control ON and OFF states of a first transistor and a second transistor based on the selected signal, wherein a first pulse width associated with an output signal of the first pulse width modulation control circuit varies in response to the first pulse signal;
    a second error amplifier configured to amplify a difference between the second output signal and a second reference signal and to output a second difference signal;
    a second detection circuit configured to detect a second load state based on the second difference signal and to output a second control signal;
    a second skipping circuit configured to selectively skip pulses of the oscillation frequency signal and to generate a second skipped signal;
    a second selector configured to select one of the oscillation frequency signal and the second skipped signal based on the second control signal; and
    a second pulse width modulation control circuit configured to control ON and OFF state of a third transistor and a fourth transistor based on the selected signal.

6. The DC-DC converter of claim 5, wherein the output signal of the second pulse width modulation control circuit has a second pulse width, and wherein the first pulse width and the second pulse width is varied for the light load conditions in response to variation in the first skipped signal and the second skipped signal respectively.

7. The DC-DC converter of claim 5, wherein the first skipped signal or the second skipped signal is output when a load voltage equals a reference voltage.

8. The DC-DC converter of claim 7, wherein the first skipped signal or the second skipped signal is output once during each period until the load voltage equals the reference voltage next time.

9. A DC-DC converter for performing a pulse frequency modulation control for a light load condition and outputting a first output signal and signal and a second output signal, comprising:
    an oscillation circuit configured to output an oscillation frequency signal;
    a first error amplifier configured to amplify a difference between the first output signal and a first reference signal and to output a first difference signal;
    a first detection circuit configured to detect a first load state based on the first difference signal and to output a first control signal;
    a first frequency intermittent circuit configured, during the light load condition, to selectively skip pulses of the oscillation frequency signal, compare a first load voltage with a first reference voltage and output a first pulse signal in response to the oscillation frequency signal when the first load voltage equals the first reference voltage;
    a first selector configured to select one of the oscillation frequency signal and the first pulse signal based on the first control signal;
    a first pulse width modulation control circuit configured to control ON and OFF states of a first transistor and a second transistor based on the selected signal, wherein a first pulse width associated with an output signal of the first pulse width modulation control circuit varies in response to the first pulse signal;

a second error amplifier configured to amplify a difference between the second output signal and a second reference signal and to output a second difference signal;

a second detection circuit configured to detect a second load state based on the second difference signal and to output a second control signal;

a second frequency intermittent circuit configured to selectively skip pulses of the oscillation frequency signal, compare a second load voltage and a second reference voltage and output a second pulse signal in response to the oscillation frequency signal when the second load voltage equals the second reference voltage;

a second selector configured to select one of the oscillation frequency signal and the second pulse signal based on the second control signal; and a second pulse width modulation control circuit configured to control ON and OFF states of a third transistor and a fourth transistor in response to the selected signal.

10. The DC-DC converter according to claim 9, wherein the output signal for the second pulse width modulation control circuit has a second pulse width, and wherein the second pulse width varies in response to the second pulse signal.

11. The DC-DC converter of claim 10, wherein the first pulse signal or the second pulse signal is output once during each period until the first load voltage equals the first reference voltage or the second load voltage equals the second reference voltage next time.

12. A power supply system, comprising:
a DC-DC converter configured to generate a power supply voltage by performing pulse frequency modulation control at a light load condition; and
an internal circuit configured to operate variably with variations in the power supply voltage;
wherein the DC-DC converter includes:
  an oscillation circuit configured to output an oscillation frequency signal;
  an error amplifier configured to amplify a difference between the power supply voltage and a reference signal and to output a difference signal;
  a detection circuit configured to detect a load state based on the difference signal and to output a control signal;
  a skipping circuit configured to, during the light load condition, selectively skip pulses of the oscillation frequency signal and to generate a skipped signal, wherein the skipping circuit includes a frequency intermittent circuit that outputs a pulse signal;
  a selector configured to select one of the oscillation frequency signal and the skipped signal based on the control signal; and
  a pulse width modulation control circuit configured to control ON and OFF states of a first transistor and a second transistor based on the selected signal, wherein a pulse width associated with an output signal of the pulse width modulation control circuit varies in response to the pulse signal.

13. The power supply system of claim 12, wherein the pulse width that varies in response to variation in the skipped signal.

14. The power supply system of claim 12, wherein the frequency intermittent circuit is configured to compare the power supply voltage with a reference voltage and to output the pulse signal based on the oscillation frequency signal when the power supply voltage equals the reference voltage.

15. The power supply system according to claim 14, wherein the pulse signal is output once during each period until the load voltage equals the reference voltage next time.

16. A power supply system, comprising:
a DC-DC converter configured to perform pulse frequency modulation control at a light load condition and to generate a first power supply voltage and a second power supply voltage;
a first internal circuit configured to operate for a first power supply voltage range; and
a second internal circuit configured to operate for a second power supply voltage range,
wherein the DC-DC converter includes:
  an oscillation circuit configured to output an oscillation frequency signal;
  a first error amplifier configured to amplify a difference between the first power supply voltage and a first reference signal and to output a first difference signal;
  a first detection circuit configured to detect a first load state based on the first difference signal and to output a first control signal;
  a first skipping circuit configured to, during the light load condition, selectively skip pulses of the oscillation frequency signal and to generate a first skipped signal;
  a first selector configured to select one of the oscillation frequency signal and the first skipped pulse signal based on the first control signal;
  a first pulse width modulation control circuit configured to control ON and OFF states of a first transistor and a second transistor based on the selected signal so as to output the first power supply voltage, wherein a first pulse width associated with an output signal of the first pulse width modulation control circuit varies in response to the first skipped pulse signal;
  a second error amplifier configured to amplify a difference between the second power supply voltage and a second reference signal and to output a second difference signal;
  a second detection circuit configured to detect a second load state based on the second difference signal and to output a second control signal;
  a second skipping circuit configured to selectively skip pulses of the oscillation frequency signal and to generate a second skipped signal;
  a second selector configured to select one of the oscillation frequency signal and the second skipped signal based on the second control signal; and
  a second pulse width modulation control circuit configured to control ON and OFF states of a third transistor and a fourth transistor based on the selected signal so as to output the second power supply voltage.

17. The power supply system of claim 16, wherein the second pulse width modulation control circuit has an output signal having a second pulse width, and wherein the first pulse width or the second pulse width is varied at the light load in response to variation in the first skipped signal or the second skipped signal.

* * * * *